United States Patent
Ibaraki et al.

(10) Patent No.: US 12,522,697 B2
(45) Date of Patent: Jan. 13, 2026

(54) POLYARYLENE SULFIDE, AND PURIFICATION METHOD AND PRODUCTION METHOD THEREFOR

(71) Applicant: DIC Corporation, Tokyo (JP)

(72) Inventors: Taku Ibaraki, Ichihara (JP); Satoshi Inoue, Ichihara (JP); Hideki Watanabe, Ichihara (JP); Takashi Furusawa, Ichihara (JP)

(73) Assignee: DIC Corporation, Tokyo (JP)

( * ) Notice: Subject to any disclaimer, the term of this patent is extended or adjusted under 35 U.S.C. 154(b) by 844 days.

(21) Appl. No.: 17/776,113

(22) PCT Filed: Dec. 10, 2020

(86) PCT No.: PCT/JP2020/045955
§ 371 (c)(1),
(2) Date: May 11, 2022

(87) PCT Pub. No.: WO2021/117795
PCT Pub. Date: Jun. 17, 2021

(65) Prior Publication Data
US 2022/0389167 A1   Dec. 8, 2022

(30) Foreign Application Priority Data

Dec. 11, 2019  (JP) ................. 2019-223662

(51) Int. Cl.
*C08G 75/0259* (2016.01)
*C08G 75/0281* (2016.01)

(52) U.S. Cl.
CPC ..... *C08G 75/0259* (2013.01); *C08G 75/0281* (2013.01)

(58) Field of Classification Search
CPC ................. C08G 75/0259; C08G 75/0281
See application file for complete search history.

(56) References Cited

U.S. PATENT DOCUMENTS

| 3,919,177 A | 11/1975 | Campbell |
| 5,352,768 A | 10/1994 | Stuber et al. |

FOREIGN PATENT DOCUMENTS

| JP | S52-12240 B2 | 4/1977 |
| JP | H06-192421 A | 7/1994 |
| JP | 2002-187949 A | 7/2002 |
| JP | 2005-264030 A | 9/2005 |
| JP | 2008247955 A | * 10/2008 |
| WO | WO-2020032171 A1 | * 2/2020 |

* cited by examiner

*Primary Examiner* — Kumar R Bhushan
(74) *Attorney, Agent, or Firm* — Troutman Pepper Locke LLP; James E. Armstrong, IV; Nicholas J. DiCeglie, Jr.

(57) ABSTRACT

Provided are a purification method for a polyarylene sulfide (PAS) that can efficiently reduce the amount of a carboxyalkylamino group-containing compound in the PAS by treating the carboxyalkylamino group-containing compound in the PAS under a low pressure without using a strong acid, and a production method for a PAS having a reduced amount of the carboxyalkylamino group-containing compound in the PAS. The purification method for a PAS includes: a step of obtaining a crude PAS-containing mixture by removing a solvent from a crude reaction product containing the PAS obtained by reacting a polyhalo aromatic compound with a sulfidizing agent in an organic polar solvent; a step of bringing the crude PAS mixture into contact with water and an oxygen atom-containing solvent to convert the crude PAS into porous particles; and a step of bringing the obtained porous particles into contact with carbonated water.

18 Claims, No Drawings

POLYARYLENE SULFIDE, AND PURIFICATION METHOD AND PRODUCTION METHOD THEREFOR

TECHNICAL FIELD

The present invention relates to a purification method and a production method for a polyarylene sulfide (hereinafter, may be abbreviated as PAS). More specifically, the invention relates to a purification method and a production method that can reduce corrosion to a production facility or a mold during molding and improve the PAS in quality as compared with a purification method that uses various strong acids (hydrochloric acid, sulfuric acid, etc.) in the related art. In addition, an object of the invention is to provide a PAS suitable as materials for a wide range of applications, such as various molding materials or films, fibers, electric and electronic components, automobile components, and paints.

BACKGROUND ART

Among the PAS, a typical polyphenylene sulfide (hereinafter, may be abbreviated as PPS) is generally obtained by a method of reacting an alkali metal sulfide typified by sodium sulfide or an alkali metal hydrosulfide typified by sodium hydrosulfide with an alkali metal hydroxide typified by sodium hydroxide, and a polyhalo aromatic compound typified by p-dichlorobenzene in an organic solvent having relatively high polarity such as N-methyl-2-pyrrolidone, N,N-dimethylacetamide, or N-methyl-ε-caprolactam, as described in PTL 1 (see PTL 1).

A polymerization reaction is generally performed under a high temperature and pressure and alkaline condition, and as the polymerization reaction progresses, sodium chloride is generated. A so-called crude reaction product after the polymerization reaction contains at least the PAS and an alkali metal halide, as well as an unreacted raw material, a cyclic or linear oligomer, and a by-product typified by a compound (hereinafter, may be referred to as a carboxyalkylamino group-containing compound) represented by the following structural formula (1).

[Chem. 1]

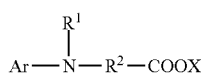
(1)

(In the formula, Ar represents an aryl group having a halogen atom, $R^1$ represents a hydrogen atom, an alkyl group having 1 to 3 carbon atoms, or a cyclohexyl group, $R^2$ represents an alkylene group having 3 to 5 carbon atoms, and X represents a hydrogen atom or an alkali metal atom. In addition, a —$NR^1R^2COOX$ group may be referred to as a carboxyalkylamino group.)

Further, during the production of the PAS, as raw materials for producing the PAS, for example, when an amide-based solvent is N-methyl-2-pyrrolidone and the polyhalo aromatic compound is p-dichlorobenzene, a compound represented by the following general formula (2) (in the formula, X represents a hydrogen atom or an alkali metal atom) is obtained as the carboxyalkylamino group-containing compound.

[Chem. 2]

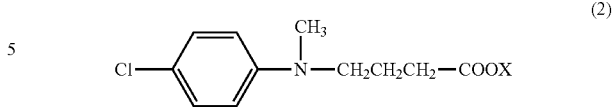
(2)

(The compound is abbreviated as "CP-MABA", and in particular, the compound may be abbreviated as "CP-MABA (hydrogen type)" when X is a hydrogen atom, "CP-MABA (alkali metal salt type)" when X is an alkali metal atom, and "CP-MABA (Na salt type)" when X is a sodium atom, particularly).

The crude reaction product after the polymerization reaction is taken out into an appropriate container, and a solvent contained therein is separated and recovered by appropriate means (appropriate methods such as a vacuum distillation method, a centrifugal separation method, a screw decanter method, a vacuum filtration method, or a pressure filtration method can be selected) (this operation is referred to as "solvent removal" herein) and reused, or further purified as necessary and reused.

On the other hand, the solvent is removed to separate and remove an organic polar solvent, then a mixture containing the PAS (hereinafter, referred to as crude PAS) contained in the crude reaction product is repeatedly washed and filtered in general, and then the mixture after removing main impurities such as sodium chloride and an alkaline substance is dried to obtain the PAS.

The PAS thus obtained is used in fibers, films, paints, compounds for injection molding materials, fiber reinforced composite materials, etc. due to excellent chemical resistance, electrical property, and mechanical property thereof. However, in order to improve the toughness, a PAS having excellent reactivity with epoxysilane or functional group-containing elastomer (hereinafter, simply referred to as "reactivity") by increasing the amount of a carboxy group at the polymer chain end is desired.

Therefore, a method of improving the amount of the carboxy group at the polymer chain end by bringing the crude PAS into contact with an acid in a step of purifying the mixture containing the crude PAS (see PTL 2) has been proposed. However, there are many methods using a strong acid, which have a serious problem in terms of corrosion to devices and facilities, and also cause deterioration of a color tone of the obtained PAS and deterioration of characteristics of a product.

Therefore, a method has been proposed in which after washing with NMP, carbon dioxide gas or carbonated water is introduced into the system to bring the carbon dioxide gas or the carbonated water into contact with the crude PAS (see PTLs 3 and 4). However, the PAS obtained by this method is excellent in reactivity, but has a feature that the crystallization rate is high. When a molded article is produced by using the PAS having such a high crystallization rate, and the molded article is applied to a large-sized molded article or a thickened molded article which has been demanded for an object of replacing metal parts in recent years, a molding defect may occur.

CITATION LIST

Patent Literature

PTL 1: JP-B-S52-12240
PTL 2: JP-A-H06-192421

PTL 3: JP-A-2005-264030
PTL 4: JP-A-2002-187949

SUMMARY OF INVENTION

Technical Problem

Therefore, an object of the invention is to provide a purification method for a PAS having excellent reactivity and a low crystallization rate, a production method for a PAS having excellent reactivity and a low crystallization rate and including the step, and a PAS having excellent reactivity and a low crystallization rate.

Solution to Problem

As a result of various studies, the present inventors have found that as a result of adjusting a by-product represented by a residual carboxyalkylamino group-containing compound to a specific content by a purification method, in which a mixture containing a crude PAS is brought into contact with a specific organic solvent and into contact with water to make the mixture porous, and then the porous crude PAS is brought into contact with water and carbon dioxide gas or carbonated water, a PAS having excellent reactivity and a low crystallization rate can be obtained. Thus, the invention has been completed.

That is, the invention relates to a purification method for a PAS, which includes a step (1) of obtaining a mixture containing a crude PAS by removing a solvent from a crude reaction product containing a PAS obtained by reacting a polyhalo aromatic compound with a sulfidizing agent in an organic polar solvent, a step (2) of purifying the mixture containing the crude PAS to convert the crude PAS into porous particles having a specific surface area in the range of 30 [m$^2$/g] or more, and a step (3) of bringing the obtained porous particles into contact with carbonated water, in which the step (2) includes a step of performing a step (2Ss) of bringing the mixture containing the crude PAS into contact with an oxygen atom-containing solvent having 1 to 3 carbon atoms and a step (2Sw) of bringing the mixture containing the crude PAS into contact with water each for at least once, and a ratio of a compound (1) represented by the following structural formula (1) in the porous particles after the step (3) is in the range of more than 1000 [ppm] to 3000 [ppm] or less.

[Chem. 3]

(In the formula, Ar represents an aryl group having a halogen atom, R$^1$ represents a hydrogen atom, an alkyl group having 1 to 3 carbon atoms, or a cyclohexyl group, R$^2$ represents an alkylene group having 3 to 5 carbon atoms, and X represents a hydrogen atom or an alkali metal atom.)

In addition, the invention relates to a purification method for a PAS, which includes a step of purifying a PAS by the purification method described above.

In addition, the invention relates to a PAS, which is porous particles having a specific surface area in the range of 10 [m$^2$/g] or more, in which a ratio of the content of a compound (1) represented by the following structural formula (1) is in the range of more than 1000 [ppm] to 3000 [ppm] or less.

[Chem. 4]

(In the formula, Ar represents an aryl group having a halogen atom, R$^1$ represents a hydrogen atom, an alkyl group having 1 to 3 carbon atoms, or a cyclohexyl group, R$^2$ represents an alkylene group having 3 to 5 carbon atoms, and X represents a hydrogen atom or an alkali metal atom.)

Advantageous Effects of Invention

According to the invention, it is possible to provide a purification method for a PAS having excellent reactivity and a low crystallization rate, a production method for a PAS having excellent reactivity and a low crystallization rate and including the step, and a PAS having excellent reactivity and a low crystallization rate.

DESCRIPTION OF EMBODIMENTS

A purification method according to the invention includes a step (1) of obtaining a mixture containing a crude PAS by removing a solvent from a crude reaction product containing a PAS obtained by reacting a polyhalo aromatic compound with a sulfidizing agent in an organic polar solvent.

The PAS is generally synthesized by reacting, under an appropriate polymerization condition, at least one polyhalo aromatic compound with at least one sulfidizing agent in an organic polar solvent represented by N-methyl-2-pyrrolidone or the like.

The polyhalo aromatic compound used in the invention is, for example, a halogenated aromatic compound having two or more halogen atoms directly bonded to an aromatic ring, and specific examples thereof include dihalo aromatic compounds such as p-dichlorobenzene, o-dichlorobenzene, m-dichlorobenzene, trichlorobenzene, tetrachlorobenzene, dibromobenzene, diiodobenzene, tribromobenzene, dibromonaphthalene, triiodobenzene, dichlorodiphenylbenzene, dibromodiphenylbenzene, dichlorobenzophenone, dibromobenzophenone, dichlorodiphenyl ether, dibromodiphenyl ether, dichlorodiphenyl sulfide, dibromodiphenyl sulfide, dichlorobiphenyl, and dibromobiphenyl, and a mixture thereof, and these compounds may be block copolymerized. Among these, dihalogenated benzenes are preferred, and it is particularly preferred that p-dichlorobenzene is contained in an amount of 80 mol % or more.

In addition, in order to increase the viscosity of the PAS by forming a branched structure, the polyhalo aromatic compound having three or more halogen substituents in one molecule may be used as a branching agent as desired. Examples of such a polyhalo aromatic compound include 1,2,4-trichlorobenzene, 1,3,5-trichlorobenzene, and 1,4,6-trichloronaphthalene.

Further, a polyhalo aromatic compound having a functional group having active hydrogen such as an amino group, a thiol group, or a hydroxy group can be exemplified, and specific examples thereof include: dihaloanilines such as 2,6-dichloroaniline, 2,5-dichloroaniline, 2,4-dichloroaniline, and 2,3-di chloroaniline; trihaloanilines such as 2,3,4- trichloroaniline, 2,3,5-trichloroaniline, 2,4,6-trichloroaniline, and 3,4,5-trichloroaniline; dihaloaminodiphenyl ethers such as 2,2'-diamino-4,4'-dichlorodiphenyl ether and 2,4'-diamino-2',4-dichlorodiphenyl ether; and compounds in which the amino group is substituted with a thiol group or a hydroxy group in a mixture thereof.

In addition, it is also possible to use an active hydrogen-containing polyhalo aromatic compound in which the hydrogen atom bonded to the carbon atom that forms the aromatic ring in the active hydrogen-containing polyhalo aromatic compounds is substituted with another inactive group, for example, a hydrocarbon group such as an alkyl group.

Among these various active hydrogen-containing polyhalo aromatic compounds, an active hydrogen-containing dihalo aromatic compound is preferred, and dichloroaniline is particularly preferred.

Examples of a polyhalo aromatic compound having a nitro group include: mono- or di-halonitrobenzenes such as 2,4-dinitrochlorobenzene and 2,5-dichloronitrobenzene; dihalonitrodiphenyl ethers such as 2-nitro-4,4'-dichlorodiphenyl ether; dihalonitrodiphenyl sulfones such as 3,3'-dinitro-4,4'-dichlorodiphenyl sulfone; mono- or di-halonitropyridines such as 2,5-dichloro-3-nitropyridine and 2-chloro-3,5-dinitropyridine; or various dihalonitronaphthalenes.

Examples of the alkali metal sulfide used in the invention include lithium sulfide, sodium sulfide, rubidium sulfide, cesium sulfide, and a mixture thereof. Such an alkali metal sulfide can be used as a hydrate, an aqueous mixture, or an anhydride. In addition, the alkali metal sulfide can also be derived by a reaction between an alkali metal hydrosulfide and an alkali metal hydroxide.

In addition, generally, a small amount of the alkali metal hydroxide may be added in order to react with the alkali metal hydrosulfide and an alkali metal thiosulfate which are present in a trace amount in the alkali metal sulfide.

Examples of the organic polar solvent used in the invention include N-methyl-2-pyrrolidone, formamide, acetamide, N-methylformamide, N,N-dimethylacetamide, 2-pyrrolidone, N-methyl-ε-caprolactam, ε-caprolactam, hexamethylphosphoramide, tetramethylurea, N-dimethylpropylene urea, amide urea of 1,3-dimethyl-2-imidazolidinone, and lactams, sulfolanes such as sulfolane and dimethylsulfolane, nitriles such as benzonitrile, ketones such as methyl phenyl ketone, and a mixture thereof.

In the presence of these organic polar solvents, a polymerization condition for the sulfidizing agent and the polyhalo aromatic compound is generally a temperature of 200° C. to 330° C., and a pressure should be within the range such that a polymerization solvent and a polyhalo aromatic compound as a polymerization monomer are substantially retained in a liquid layer, which is generally selected from the range of 0.1 MPa to 20 MPa, and preferably the range of 0.1 MPa to 2 MPa. The reaction time varies depending on the temperature and the pressure, and is generally in the range of 10 minutes to 72 hours, and preferably in the range of 1 hour to 48 hours.

The invention also includes an embodiment in which the crude reaction product is obtained by reacting the polyhalo aromatic compound and the organic polar solvent while being continuously or intermittently added in the presence of the sulfidizing agent and the organic polar solvent.

In the invention, the crude reaction product containing the PAS obtained by the polymerization reaction is subjected to "solvent removal" by appropriate means (appropriate methods such as a vacuum distillation method, a centrifugal separation method, a screw decanter method, a vacuum filtration method, or a pressure filtration method can be selected) to separate and remove the organic polar solvent, and then the mixture containing the crude PAS can be obtained. The degree of separation and removal for the organic polar solvent is not particularly limited, and the ratio of the solid content (solid content concentration) in the mixture is preferably 40 parts by mass or more, more preferably 50 parts by mass or more, and still more preferably 55 parts by mass or more with respect to 100 parts by mass of the mixture. The upper limit is not limited, and is preferably 100 parts by mass or less, more preferably less than 100 parts by mass, and still more preferably 99 parts by mass or less.

The purification method according to the invention subsequently includes a step (2) of purifying the mixture containing the crude PAS to convert the crude PAS into porous particles having a specific surface area in the range of 30 $[m^2/g]$ or more. The step (2) includes a step of performing a step (2Ss) of bringing the mixture containing the crude PAS into contact with an oxygen atom-containing solvent having 1 to 3 carbon atoms and a step (2Sw) of bringing the mixture containing the crude PAS into contact with water each for at least once.

In the invention, the step (2Ss) is a step of bringing the oxygen atom-containing solvent having 1 to 3 carbon atoms into contact with the mixture containing the crude PAS and washing the mixture. The temperature at which the oxygen atom-containing solvent having 1 to 3 carbon atoms is added is not particularly limited, and the temperature is in the range of preferably 10° C. or higher, more preferably 20° C. or higher to preferably 90° C. or lower, more preferably 70° C. or lower. The amount of the solvent used for one washing is not particularly limited, and is preferably 20 parts by mass or more, more preferably 50 parts by mass or more, still more preferably 100 parts by mass or more, to preferably 5000 parts by mass or less, more preferably 1800 parts by mass or less, still more preferably 600 parts by mass or less, with respect to 100 parts by mass of the PAS.

In the invention, the step (2Sw) is a step of adding an appropriate amount of water to at least the mixture containing the crude PAS obtained in the previous step (1), bringing the mixture into contact with water, and washing the mixture. The temperature at which water is added is not particularly limited, and is in the range of preferably 10° C. or higher, more preferably 20° C. or higher to preferably 120° C. or lower, more preferably 100° C. or lower, still more preferably 80° C. or lower. After washing, solid-liquid separation is preferably performed by filtration or the like to form a cake-like product. The amount of water used for one washing is not particularly limited, and is preferably 20 parts by mass or more, more preferably 50 parts by mass or more, still more preferably 100 parts by mass or more, to preferably 10000 parts by mass or less, more preferably 5000 parts by mass or less, still more preferably 2000 parts by mass or less, with respect to 100 parts by mass of the PAS.

In the step (2) of purifying the mixture containing the crude PAS, the order of the step (2Ss) and the step (2Sw) is not particularly limited, and the step (2Ss) of washing the mixture containing the crude PAS by bringing the mixture into contact with the oxygen atom-containing solvent having 1 to 3 carbon atoms may be performed after the step (2Sw) of washing the mixture containing the crude PAS by bringing the mixture into contact with water is performed, or the step (2Sw) may be performed after the step (2Ss) is performed. The steps may be performed collectively or alternately one or more times optionally. After the step (2Ss) or the step (2Sw) is performed and before the next step is performed, water or the oxygen atom-containing solvent having 1 to 3 carbon atoms used for washing is preferably removed by the solid-liquid separation.

Here, examples of the oxygen atom-containing solvent having 1 to 3 carbon atoms to be brought into contact with the mixture containing the crude PAS include at least one selected from the group consisting of an alcohol-based solvent and a ketone-based solvent. Examples of the alcohol-based solvent (also referred to as an alcohol solvent) include: alcohols having 10 or less carbon atoms, such as methyl alcohol, ethyl alcohol, n-propyl alcohol, isopropyl alcohol, n-butyl alcohol, isobutyl alcohol, t-butyl alcohol, ethylene glycol, propylene glycol, trimethylolpropane, and benzyl alcohol; alcohols having 10 or less carbon atoms and containing an ether bond, such as 2-methoxyethyl alcohol, 2-ethoxyethyl alcohol, 1-methoxy-2-propyl alcohol, 1-ethoxy-2-propyl alcohol, 3-methoxy-1-butyl alcohol, and 2-isopropoxyethyl alcohol; alcohols having 10 or less carbon atoms and containing a ketone group, such as 3-hydroxy-2-butanone; and alcohols having 10 or less carbon atoms and containing an ester group, such as methyl hydroxyisobutyrate. In addition, examples of the ketone-based solvent (also referred to as a ketone solvent) include acetone, methyl ethyl ketone, cyclohexanone, γ-butyrolactone, and N-methylpyrrolidinone. In the invention, it is preferred to use a monohydric alcohol having 10 or less carbon atoms because the residual carboxyalkylamino group-containing compound can be efficiently removed, and a monohydric alcohol having 3 or less carbon atoms is more preferred. In addition, the step (2Ss) may be performed after an aqueous solution obtained by adding water to the oxygen atom-containing solvent having 1 to 3 carbon atoms is prepared and the concentration is lowered. At this time, the concentration of the oxygen atom-containing solvent having 1 to 3 carbon atoms in the aqueous solution is not particularly limited, and is preferably in the range of 90 parts by mass or less, with respect to 100 parts by mass of the aqueous solution. More preferred is in the range of 85 parts by mass or less to preferably 25 parts by mass or more, more preferably 45 parts by mass or more.

In the invention, the step (2Ss) of bringing the crude PAS into contact with an oxygen atom-containing solvent having 1 to 3 carbon atoms and the step (2Sw) of bringing the crude PAS into contact with water are performed once or repeatedly performed a plurality of times to form porous particles having a specific surface area in the range of 30 $[m^2/g]$ or more, preferably 43 $[m^2/g]$ or more, more preferably 60 $[m^2/g]$ or more to preferably 200 $[m^2/g]$ or less, more preferably 120 $[m^2/g]$ or less.

It is preferred to use the crude PAS as porous particles having such a range of specific surface area because the amount of the carboxyalkylamino group-containing compound in the crude PAS can be easily reduced to a desired range.

The purification method according to the invention subsequently includes a step (3) of bringing the obtained porous particles into contact with carbonated water.

In the invention, the condition of bringing the porous particles obtained in the previous step (2) into contact with the carbonated water is preferably in the range of 10° C. or higher, more preferably 20° C. or higher to preferably 100° C. or lower, more preferably 80° C. or lower, and the pressure (gauge pressure) is in the range of less than 0.1 MPa, preferably 0.05 MPa or less, more preferably under atmospheric pressure.

The amount of the carbonated water used in the contact with the porous particles is also not particularly limited, and from the viewpoints that the porous particles and the carbonated water are well contacted and the purification efficiency is more suitable, the amount of the carbonated water is in the range of preferably 50 parts by mass or more, more preferably 100 parts by mass or more, still more preferably 200 parts by mass or more to preferably 2000 parts by mass or less, more preferably 1000 parts by mass or less, still more preferably 800 parts by mass or less, with respect to 100 parts by mass of the porous particles.

In addition, as one advantage of the invention, when the purification method according to the invention that uses the carbonated water is used, there is almost no corrosion to metals under a normal purification temperature condition (100° C. or lower), and a current device can be coped with. In addition, since relatively inexpensive materials with SUS304 level corrosion resistance can withstand corrosion, a merit of an equipment cost from the viewpoint of the material of the device is given compared with other acids. Further, since a pressure-resistant container is not required, not only the merit of the equipment cost but also excellent maintainability and safety are obtained, which is preferred.

In addition, as one advantage of the invention, other acids remaining in the PAS (in particular, chloride ions, sulfate ions and the like tend to remain in a polymer) is the major cause of mold corrosion during molding and deterioration of the physical property of a molded product. However, in the case of the purification method according to the invention using the carbonated water, removal is easy in a water washing step which is a later step, and decomposition and scattering occur from the PAS even in a drying step, and thus mold corrosion and deterioration of the physical property of a molded article like other acids are less likely to occur.

Further, as one advantage of the invention, when a strong acid other than the carbonated water is used, in order to remove the acid remaining in the PAS, it is necessary to remove the remaining acid while requiring a large amount of water for a number of times of washing after washing with the strong acid. However, in the case of the purification method according to the invention using the carbonated water, the amount of water used after washing with the carbonated water is small, and the number of times of washing can be reduced. Therefore, it can be said that the purification method according to the invention is a suitable method not only in terms of process capability but also in terms of environmental measures.

The invention relates to the purification method in which the molecular terminal of the PAS is converted from a basic terminal (SNa terminal) to an acidic terminal (SH terminal) by bringing the PAS into contact with an aqueous solution, which is obtained by blowing carbon dioxide gas into a sealed container or a device and controlling the solubility of carbon dioxide by controlling the pressure and the temperature in the system, for an appropriate time or longer (for example, 5 minutes or longer). The SNa group present at the end of the molecular chain of the PAS is converted into an SH group, and the affinity with other resins is increased.

The concentration of the carbon dioxide gas (carbonate ions derived therefrom) in the carbonated water depends on the solubility of carbon dioxide in water, more specifically according to Henry's law at the temperature and pressure thereof. As a method of preparing the carbonated water, the carbon dioxide gas may be bubbled into water in an open container, a closed container, or a pipe, or may be press-fitted, or may be continuously dissolved in water using a hollow fiber membrane module or the like.

When the carbonated water and the porous particles according to the invention are brought into contact with each other and purified, the solid content concentration in the system is preferably a ratio of 1 wt % to 50 wt %. More preferably, when the solid content concentration is within this range, the PAS particles and the carbonated water are favorably brought into contact with each other, and the purification efficiency is suitable. The amount of the carbonated water required for purification is also not particularly limited, and may be preferably 50 parts by mass or more, more preferably 100 parts by mass or more, still more preferably 200 parts by mass or more, and may be preferably 10000 parts by mass or less, more preferably 5000 parts by mass or less, still more preferably 2000 parts by mass or less, with respect to 100 parts by mass of the PAS. More preferably, when the amount of the carbonated water is within this range, the PAS particles and the carbonated water are favorably brought into contact with each other, and the purification efficiency is suitable.

In the invention, the contact between the carbonated water and the PAS porous particles can be performed in an open type container having a stirring blade inside the container and a filter for filtration at the bottom. It is not necessary to perform the contact in a closed type container or a container having a mixing function that can be closed, but of course, the contact can be performed in such a container.

In addition, as described above, an embodiment of the invention relates to the purification method for a PAS in which after removing the solvent from the crude reaction product containing the PAS obtained by reacting the polyhalo aromatic compound with the sulfidizing agent in the organic polar solvent, the obtained product is brought into contact with the organic solvent to form the porous particles having a specific surface area in the range of 30 $[m^2/g]$ or more, and the obtained porous particles are brought into contact with the carbonated water.

Next, one of the other embodiments of the invention relates to a production method for a PAS, which includes a step of purifying the PAS by the purification method. That is, the invention related to the production method for a PAS includes a step of obtaining a mixture containing a crude PAS by removing a solvent from a crude reaction product containing a PAS obtained by reacting a polyhalo aromatic compound with a sulfidizing agent in an organic polar solvent, a step of purifying the mixture containing the crude PAS to convert the crude PAS into porous particles having a specific surface area in the range of 30 $[m^2/g]$ or more, and a step (3) of bringing the obtained porous particles into contact with carbonated water, in which the step (2) includes a step (2Ss) of bringing the mixture containing the crude PAS into contact with an oxygen atom-containing solvent having 1 to 3 carbon atoms and a step (2Sw) of bringing the mixture containing the crude PAS into contact with water each for at least once and a ratio of a compound (1) represented by the above structural formula (1) in the porous particles after the step (3) is in the range of more than 1000 [ppm] to 3000 [ppm] or less.

The PAS obtained through the purification method or the production method according to the invention may be dried as it is, or may be further washed with water or an organic solvent, then solid-liquid separated and dried.

Drying is performed by heating to a temperature at which a solvent such as water evaporates substantially. Drying may be performed under vacuum, or may be performed in air or in an inert atmosphere such as nitrogen.

The PAS obtained through the above purification method or production method according to the invention (simply, may be referred to as "purified PAS") has the following feature. That is, the purified PAS according to the invention is porous particles having a specific surface area in the range of 10 $[m^2/g]$ or more, preferably 15 $[m^2/g]$ or more, more preferably 20 $[m^2/g]$ or more, and preferably 180 $[m^2/g]$ or less, more preferably 150 $[m^2/g]$ or less, still more preferably 100 $[m^2/g]$ or less, particularly preferably 50 $[m^2/g]$ or less.

In addition, in the purified PAS according to the invention, the ratio of the content of the compound (1) represented by the structural formula (1) is in the range of more than 1000 [ppm], preferably 1100 [ppm] to 3000 [ppm] or less, preferably 2000 [ppm] or less on a mass basis.

Further, the purified PAS according to the invention tends to have a low crystallization rate. The crystallization rate is not particularly limited, and an isothermal crystallization rate is in the range of preferably 4 [min] or longer, more preferably 5 [min] or longer to preferably 9 [min] or shorter, preferably 8 [min] or shorter. Here, the isothermal crystallization temperature is a measured value when a sample is melted at 350° C./3 min, then rapidly cooled (210° C./min) from 350° C. to 240° C., and held at a cooled temperature (240° C.) for 15 minutes using a differential scanning calorimeter.

The PAS obtained through the purification method or the production method according to the invention can be used as it is for various molding materials or the like as in the related art, and can be increased in viscosity by a heat treatment in air or oxygen-enriched air or under a reduced pressure, and thus may be used for various molding materials or the like as necessary after such a viscosity increasing operation is performed. The heat treatment temperature varies depending on the treatment time and the atmosphere for the treatment, and thus cannot be unconditionally defined, and generally, the heat treatment temperature is preferably 180° C. or higher. When the heat treatment temperature is lower than 180° C., the viscosity increasing rate is very low and the productivity is poor, which is not preferred. The heat treatment may be performed in a molten state at a temperature equal to or higher than the melting point of the polymer using an extruder or the like. However, from the viewpoint of, for example, possibility of deterioration of the polymer or workability, it is preferred to perform the heat treatment at a temperature of the melting point plus 100° C. or less.

The PAS obtained by the invention, as in the related art, can be formed into a molded article excellent in heat resistance, molding processability, dimensional stability, and the like by various melt processing methods such as injection molding, extrusion molding, compression molding, and blow molding after being blended with a filler and other resins and melted and kneaded, and then directly or once molded into pellets. However, in order to further improve performance such as strength, heat resistance, and dimensional stability, the PAS may be used in combination with various fillers as long as an object of the invention is not impaired. Examples of the filler include a fibrous filler and an inorganic filler. In addition, a small amount of a release agent, a colorant, a heat stabilizer, an ultraviolet stabilizer, a foaming agent, a rust inhibitor, a flame retardant, a lubricant, and a coupling agent can be contained as additives during molding processing without departing from the object of the invention. Further, similarly, the following synthetic resins and elastomers can be mixed and used. Examples of these synthetic resins include polyester, polyamide, polyimide, polyetherimide, polycarbonate, polyphenylene ether, polysulfone, polyethersulfone, polyether ether ketone, polyether ketone, polyarylene, polyethylene, polypropylene, polytetrafluoroethylene, polydifluoroethylene, polystyrene, ABS resins, epoxy resins, silicone resins, phenol resins, urethane resins, and liquid crystal polymers. Examples of the elastomer include polyolefin-based rubbers, fluorine rubbers, and silicone rubbers.

Since the molded article obtained by melt-molding the PAS or a resin composition containing the PAS according to the invention has excellent heat resistance, dimensional stability, and the like as those of the PPS obtained by a method in the related art, the molded article can be widely used as, for example, an electric/electronic component such as a connector, a printed circuit board, or a sealed molded article, an automobile component such as a lamp reflector or various electric components, an interior material for various buildings, aircrafts, automobiles, and the like, an injection molded/compression molded article such as a precision component such as an OA equipment component, a camera component, or a timepiece component, or an extrusion molded/drawing molded article such as a fiber, a film, a sheet, or a pipe. Further, since the crystallization rate is slower than that of the PPS obtained by the method in the related art, solidification of a gate portion can be delayed and the pressure can be applied to a thick portion during injection molding, insufficient filling so far can be eliminated and strength reduction can be prevented. Therefore, the molded article is particularly suitable for a large or thick molded article, preferably for an injection molded article, and for example, can be particularly preferably used for an injection molded article having a thick portion of 4 mm or more or a large injection molded article having one side of 200 mm or more.

EXAMPLES

Hereinafter, the invention will be described in detail with reference to Examples. These Examples are exemplary and not limiting.
(Measurement Method 1) Quantification of CP-MABA Concentration in PPS Resin
(1) Extraction of CP-MABA in PPS A 0.05% NaOH aqueous solution was added to a PPS 20 times as much as the PPS, and the mixture was heated to 200° C. and heated for 30 minutes, and subjected to solid-liquid separation to extract the CP-MABA in the PPS resin into a filtrate.
(2) [Measurement Method for CP-MABA]

The CP-MABA concentration in the obtained filtrate was calculated by performing HPLC measurement on a filtrate sample prepared in (1), and obtaining the concentration in the filtrate based on a peak area having the same retention time as that of a standard sample prepared by the following method and a calibration curve.
(Sample Preparation)

CP-MABA in the filtrate was prepared by adding a mobile phase as it was and used for measurement.
(Standard Sample: CP-MABA Synthesis)

Into a pressure-resistant container equipped with a stirrer, 83.4 g (1.0 mol) of a 48% NaOH aqueous solution and 297.4 g (3.0 mol) of N-methyl-2-pyrrolidone were charged and stirred at 230° C. for 3 hours. After the stirring was completed, the valve was open while maintaining the temperature at 230° C. to release the pressure, the pressure was reduced to 0.1 MPa at 230° C., which was about the vapor pressure of N-methyl-2-pyrrolidone, and water was distilled off. Thereafter, the valve was sealed again and the temperature was lowered to about 200° C.

Under a temperature condition of 60° C. or higher, 147.0 g (1.0 mol) of p-dichlorobenzene was heated and dissolved, and charged into the reaction mixture, and the mixture was heated to 250° C. and then stirred for 4 hours. After the stirring was completed, the obtained product was cooled to room temperature. The reaction rate of p-dichlorobenzene was 31 mol %. After cooling, the content was taken out, water was added thereto, the stirring was performed, then the unreacted p-dichlorobenzene became an insoluble matter, and the residual substance was removed by filtration.

Next, hydrochloric acid was added to the aqueous solution as the filtrate to adjust the pH of the aqueous solution to 4. At this time, a brown oily CP-MABA (hydrogen type) was generated in the aqueous solution. Chloroform was added thereto to extract the brown oily substance. The aqueous phase at this time contained N-methyl-2-pyrrolidone and 4-methylaminobutyric acid (hereinafter, abbreviated as "MABA") as a ring-opened product thereof, and thus the aqueous phase was discarded. The chloroform phase was washed with water twice.

Water was added to the chloroform phase to form a slurry, and a 48% NaOH aqueous solution was added thereto to adjust the pH of the slurry to 13. At this time, CP-MABA was a sodium salt and transferred to an aqueous phase, and since p-chloro-N-methylaniline and N-methylaniline as by-products were dissolved in the chloroform phase, the chloroform phase was discarded. The aqueous phase was washed with chloroform twice.

Dilute hydrochloric acid was added to the aqueous solution to adjust the pH of the aqueous solution to 1 or less. At this time, CP-MABA was a hydrochloride and remained in the aqueous solution, and therefore chloroform was added to the aqueous solution to extract p-chlorophenol as a by-product. The chloroform phase in which p-chlorophenol was dissolved was discarded.

A 48% NaOH aqueous solution was added to the residual aqueous solution to adjust the pH of the aqueous solution to 4. Accordingly, the CP-MABA hydrochloride was neutralized, and a brown oily CP-MABA (hydrogen type) was precipitated from the aqueous solution. The CP-MABA (hydrogen type) was extracted with chloroform and chloroform was removed under a reduced pressure to obtain the CP-MABA (hydrogen type).
(HPLC Measurement)

A well-stirred solution was sampled in an amount of 1 ml, 9 ml of the mobile phase of HPLC was added thereto, and the filtrate was used as a measurement sample. HPLC measurement of the measurement sample was performed, and the concentration in the solution was obtained based on a peak area having the same retention time as that of a standard sample prepared by the following method and a calibration curve. The condition in the HPLC measurement is as follows.

Device name: "high speed liquid chromatogram Prominence" manufactured by Shimadzu Corporation Column: "Phenomenex Luna 5u C18 (2) 100A" manufactured by Shimadzu GLC Co., Ltd.

Detector: diode array detector (DAD)

Data processing: "LC solution" manufactured by Shimadzu Corporation

Measurement condition: column temperature of 40° C.

Mobile phase: methanol/acetic acid aqueous solution 1 vol %=6/4 (vol ratio) Flow rate: 1.0 ml/min (Measurement Method 2)
Analysis Method for Specific Surface Area (BET Specific Surface Area)

For the measurement for the specific surface area, TriStar II 3020 manufactured by Shimadzu Corporation was used. The obtained PPS porous particles (sample) were placed into a cell, degassed, substituted with helium, cooled, and substituted with nitrogen to measure the specific surface area.

(Measurement Method 3)
Measurement of Isothermal Crystallization Rate of PPS

The isothermal crystallization rate was measured using a differential scanning calorimeter ("Diamond DSC" manufactured by PerkinElmer) when 4 mg of the sample was melted at 350° C./3 min, then rapidly cooled (210° C./min) from 350° C. to 240° C., and was held at the cooled temperature (240° C.) for 15 minutes. The obtained isothermal crystallization rate was indicated as "Tmax @ 240° C.".

(Measurement Example 4)
Reactivity Evaluation Method

The obtained PPS porous particles were pulverized by a small pulverizer, and then sieved by using a test sieve having an opening of 0.5 mm according to Japanese Industrial Standards Z8801. 100 parts by mass of the PPS resin passing through the sieve was blended with 0.5 parts by mass of 3-glycidoxypropyltrimethoxysilane and uniformly mixed, and then the melt viscosity V6 (a value measured after holding at 300° C., a load of $1.96 \times 10^6$ Pa, and L/D=10 (mm)/1 (mm) for 6 minutes using a flow tester CFT-500D manufactured by Shimadzu Corporation) was measured. The degree of increase in viscosity was calculated as a time based on the ratio of the melt viscosity V6 after addition to the melt viscosity V6 before addition. A higher degree of increase in viscosity indicates higher excellent reactivity.

Measurement Example 5

Cavity Balance

With a tumbler, 65 parts by mass of each of the purified PPS obtained in Examples 1 to 4 and Comparative Examples 1 and 2 and 5 parts by mass of an olefin-based thermoplastic elastomer "Bond Fast-E" manufactured by Sumitomo Chemical Co., Ltd. were uniformly mixed. Thereafter, the blended material was charged into a charging port (top feeder) of a twin-screw extruder with a vent (TEX30a manufactured by Japan Steel Works, Ltd.), 30 parts by mass of glass fibers (chopped strand, fiber diameter: 10 μm, fiber length: 3 mm, epoxy resin bundling agent) were charged from a side feeder, the resin component discharge amount was set to 30 kg/hr, the screw rotation speed was set to 220 rpm, and the set resin temperature was 320° C., the mixture was melt-kneaded, and a strand material discharged from the discharge port was cut to obtain pellets of the PPS compound.

Subsequently, the pellets were supplied to an injection molding machine (SE75D-HP) manufactured by Sumitomo Heavy Industries, Ltd. in which the cylinder temperature was set to 310° C., and injection molding was performed under the following conditions. That is, a washer mold having 40 cavities was used, and the minimum molding condition was set as long as a cavity (C1) at a position closest to a primary sprue was completely filled. Other molding conditions were a 75 ton molding machine, a cylinder temperature of 320° C., a mold temperature of 140° C., and no pressure holding.

The filling degree of a cavity (C10) farthest from the primary sprue in the same runner as the cavity (C1) after molding was compared. The filling degree (mass %) was obtained based on the mass ratio of the molded article in the cavity (C10) to the molded article in the cavity (C1). It can be said that the higher the filling degree of the cavity (C10) is, the more excellent the cavity balance is. Based on the filling degree, the cavity balance of each composition was determined according to the following criteria.

AA: a range from 100 mass % or less to 90 mass % or more
A: a range from less than 90 mass % to 80 mass % or more
B: a range from less than 80 mass % to 70 mass % or more
C: a range from less than 70 mass % to 60 mass % or more
D: a range of less than 60 mass %

Synthesis Example 1

Polymerization Step of PPS

Into a 150 L autoclave equipped with a pressure gauge, a thermometer, a condenser, a decanter, a rectifying column, and a stirring blade, 33.222 kg (226 mol) of p-dichlorobenzene (hereinafter, abbreviated as DCB), 2.280 kg (23 mol) of NMP, 27.300 kg (230 mol) of 47.23 mass % sodium hydrosulfide, and 18.533 kg (228 mol) of 49.21 mass % sodium hydroxide were charged, the temperature was increased to 173° C. over 5 hours in a nitrogen atmosphere while stirring to distill 27.3 kg of water, and then the autoclave was sealed. DCB distilled by azeotropism during dehydration was separated by the decanter and returned to the autoclave as needed, and an anhydrous sodium sulfide composition was dispersed in DCB inside the autoclave after completion of dehydration. Further, the internal temperature was cooled to 160° C., 47.492 kg (479 mol) of NMP was charged, and the temperature was increased to 185° C. When the pressure reached 0.00 MPa, the valve connected to the rectifying column was open, and the internal temperature was increased to 200° C. over 1 hour. At this time, the temperature at an outlet of the rectifying column was controlled to be 110° C. or lower by cooling and adjusting the degree of opening of the valve. A mixed steam of the distilled DCB and water was condensed by the condenser, separated by the decanter, and DCB was returned to the autoclave. The amount of distilled water was 179 g. Next, the internal temperature was increased from 200° C. to 230° C. over 3 hours, after stirring for 1 hour, the temperature was increased to 250° C., and after stirring for 1 hour and the reaction was completed, the internal temperature of the autoclave was cooled from 250° C. to 235° C. A bottom valve of the autoclave was open when the internal temperature reached 235° C., the autoclave was flushed in a 150 L vacuum stirring dryer equipped with a stirring blade (a temperature of a jacket of a solvent removing machine: 120° C.) in a reduced pressure state to remove N-methyl-2-pyrrolidone, the internal temperature was cooled to room temperature, and sampling was performed to obtain a crude PPS mixture of 55% N.V.

Example 1

Into a flask, 400 g of the crude PPS mixture obtained in Synthesis Example 1 and 422 g of a methanol aqueous solution ("special grade chemical" manufactured by FUJIFILM Wako Pure Chemical Industries, Ltd.) were charged, and stirred and mixed at 40° C. for 30 minutes, a slurry thereof was filtered through a Kiriyama funnel under a reduced pressure and compacted from above, and 422 g of a 80 wt % methanol aqueous solution (obtained by adding 20 parts by mass of water to 80 parts by mass of a methanol aqueous solution of "special grade chemical" manufactured by FUJIFILM Wako Pure Chemical Industries, Ltd.) was further poured several times from above into the funnel and filtered. Further, a cake prepared by filtration was transferred to a beaker and crushed into a powder with a spatula, 422 g of water at 20° C. was poured thereto, and the obtained mixture was stirred and mixed for 30 minutes. The slurry was filtered through the Kiriyama funnel under a reduced pressure and compacted from above, and 422 g of water at 20° C. was further poured several times from above into the funnel and filtered.

The cake was transferred to the beaker, and 634 g of carbonated water was poured thereto, and the obtained mixture was stirred and mixed for 1 hour. The slurry was filtered through the Kiriyama funnel under a reduced pressure and compacted from above, and 442 g of carbonated water was further poured several times from above into the flask and filtered.

The cake prepared by filtration was transferred to a vat, crushed into a powder with the spatula, and dried at 120° C. for 4 hours to obtain the purified PPS. The obtained purified PPS was measured. Results are shown in Table 1.

Example 2

Into a flask, 400 g of the crude PPS mixture obtained in Synthesis Example 1 and 422 g of a methanol aqueous solution ("special grade chemical" manufactured by FUJIFILM Wako Pure Chemical Industries, Ltd.) were charged, and stirred and mixed at 40° C. for 30 minutes, a slurry thereof was filtered through a Kiriyama funnel under a reduced pressure and compacted from above, and 422 g of a 50 wt % methanol aqueous solution (obtained by adding 50 parts by mass of water to 50 parts by mass of a methanol aqueous solution of "special grade chemical" manufactured by FUJIFILM Wako Pure Chemical Industries, Ltd.) was further poured several times from above into the funnel and filtered. Further, a cake prepared by filtration was transferred to a beaker and crushed into a powder with a spatula, 442 g of water at 20° C. was poured thereto, and the obtained mixture was stirred and mixed for 30 minutes. The slurry was filtered through the Kiriyama funnel under a reduced pressure and compacted from above, and 422 g of water at 20° C. was further poured several times from above into the funnel and filtered.

The cake was transferred to a beaker, and 634 g of carbonated water was poured thereto, and the obtained mixture was stirred and mixed for 1 hour. The slurry was filtered through the Kiriyama funnel under a reduced pressure and compacted from above, and 442 g of carbonated water was further poured several times from above into the funnel and filtered.

The cake prepared by filtration was transferred to a vat, crushed into a powder with the spatula, and dried at 120° C. for 4 hours to obtain the purified PPS. The obtained purified PPS was measured. Results are shown in Table 1.

Example 3

Into a flask, 400 g of the crude PPS mixture obtained in Synthesis Example 1 and 422 g of a methanol aqueous solution ("special grade chemical" manufactured by FUJIFILM Wako Pure Chemical Industries, Ltd.) were charged, and stirred and mixed at 40° C. for 30 minutes, a slurry thereof was filtered through a Kiriyama funnel under a reduced pressure and compacted from above, and 422 g of a 30 wt % methanol aqueous solution (obtained by adding 70 parts by mass of water to 30 parts by mass of a methanol aqueous solution of "special grade chemical" manufactured by FUJIFILM Wako Pure Chemical Industries, Ltd.) was further poured several times from above into the funnel and filtered. Further, a cake prepared by filtration was transferred to a beaker and crushed into a powder with a spatula, 442 g of water at 20° C. was poured thereto, and the obtained mixture was stirred and mixed for 30 minutes. The slurry was filtered through the Kiriyama funnel under a reduced pressure and compacted from above, and 422 g of water at 20° C. was further poured several times from above into the funnel and filtered.

The cake was transferred to a beaker, 643 g of carbonated water was poured thereto, and the obtained mixture was stirred and mixed for 1 hour. The slurry was filtered through the Kiriyama funnel under a reduced pressure and compacted from above, and 442 g of carbonated water was further poured several times from above into the funnel and filtered.

The cake prepared by filtration was transferred to a vat, crushed into a powder with the spatula, and dried at 120° C. for 4 hours to obtain the purified PPS. The obtained purified PPS was measured. Results are shown in Table 1.

Comparative Example 1

Into a flask, 400 g of the crude PPS mixture obtained in Synthesis Example 1 and 422 g of NMP were charged, and stirred and mixed at 40° C. for 30 minutes, a slurry thereof was filtered through a Kiriyama funnel under a reduced pressure and compacted from above, and 422 g of NMP was further poured several times from above into the funnel and filtered. Further, a cake prepared by filtration was transferred to a beaker and crushed into a powder with a spatula, 442 g of water at 70° C. was poured thereto, and the obtained mixture was stirred and mixed for 30 minutes. The slurry the slurry was filtered through the Kiriyama funnel under a reduced pressure and compacted from above, and 442 g of water at 70° C. was further poured several times from above into the funnel and filtered. The cake prepared by filtration and 634 g of carbonated water were charged into an autoclave, and the obtained mixture was stirred and mixed at 160° C. for 1 hour. The slurry was filtered through the Kiriyama funnel under a reduced pressure and compacted from above, and 422 g of carbonated water at 25° C. was further poured several times from above into the funnel and filtered. The cake prepared by filtration was transferred to a vat, crushed into a powder with the spatula, and dried at 120° C. for 4 hours to obtain the purified PPS. The obtained purified PPS was measured. Results are shown in Table 1.

Comparative Example 2

Into a flask, 400 g of the crude PPS mixture obtained in Synthesis Example 1 and 422 g of NMP were charged, and stirred and mixed at 40° C. for 30 minutes, a slurry thereof was filtered through a Kiriyama funnel under a reduced pressure and compacted from above, and 422 g of NMP was further poured several times from above into the funnel and filtered. Further, a cake prepared by filtration was transferred to a beaker and crushed into a powder with a spatula, 442 g of water at 70° C. was poured thereto, and the obtained mixture was stirred and mixed for 30 minutes. The slurry the slurry was filtered through the Kiriyama funnel under a reduced pressure and compacted from above, and 442 g of water at 70° C. was further poured several times from above into the funnel and filtered. The cake prepared by filtration and 634 g of carbonated water were charged into a flask, and the obtained mixture was stirred and mixed at 25° C. for 1 hour. The slurry was filtered through the Kiriyama funnel under a reduced pressure and compacted from above, and 422 g of carbonated water at 25° C. was further poured several times from above into the funnel and filtered. The cake prepared by filtration was transferred to a vat, crushed into a powder with the spatula, and dried at 120° C. for 4 hours to obtain the purified PPS. The obtained purified PPS was measured. Results are shown in Table 1.

TABLE 1

|  | Example 1 | Example 2 | Example 3 | Comparative Example 1 | Comparative Example 2 |
|---|---|---|---|---|---|
| Tmax @ 240° C. [min] | 4.5 | 6.4 | 7.5 | 1.1 | 1.5 |
| CP-MABA [ppm] | 1150 | 1560 | 2170 | 170 | 330 |
| COOH content [μmol/g] | 31 | 29 | 24 | 42 | 27 |
| Epoxysilane reactivity | 27 times | 25 times | 24 times | 24 times | 22 times |
| Cavity balance | AA | AA | AA | B | B |

It is found that when Comparative Examples 1 and 2 are compared with Examples 1 to 3, any PPS is excellent in reactivity, but the cavity balance is greatly improved in the PPS according to Examples 1 to 3.

The invention claimed is:

1. A purification method for a polyarylene sulfide, comprising:
   a step (1) of obtaining a mixture containing a crude polyarylene sulfide by removing a solvent from a crude reaction product containing a polyarylene sulfide obtained by reacting a polyhalo aromatic compound with a sulfidizing agent in an organic polar solvent;
   a step (2) of purifying the mixture containing the crude polyarylene sulfide to convert the crude polyarylene sulfide into porous particles having a specific surface area in a range of 30 [m²/g] or more; and
   a step (3) of bringing the obtained polyarylene sulfide porous particles into contact with carbonated water, wherein
   the step (2) includes a step of performing a step (2Ss) of bringing the mixture containing the crude polyarylene sulfide into contact with an oxygen atom-containing solvent having 1 to 3 carbon atoms and a step (2Sw) of bringing the mixture containing the crude polyarylene sulfide into contact with water each for at least once, and
   a ratio of a compound (1) represented by the following structural formula (1) contained in the porous particles after the step (3) is in a range of 1100 [ppm] to 3000 [ppm] or less,

[Chem. 1]

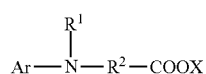
(1)

in the formula, Ar represents an aryl group having a halogen atom, R¹ represents a hydrogen atom, an alkyl group having 1 to 3 carbon atoms, or a cyclohexyl group, R² represents an alkylene group having 3 to 5 carbon atoms, and X represents a hydrogen atom or an alkali metal atom.

2. The purification method according to claim 1, wherein in the step (2), the oxygen atom-containing solvent having 1 to 3 carbon atoms is an aqueous solution.

3. The purification method according to claim 2, wherein the oxygen atom-containing solvent having 1 to 3 carbon atoms has a concentration in the aqueous solution in a range of 90 parts by mass or less with respect to 100 parts by mass of the aqueous solution.

4. The purification method according to claim 1, wherein in the step (3), the polyarylene sulfide porous particles and the carbonated water are brought into contact with each other under a pressure smaller than 0.1 MPa.

5. The purification method according to claim 1, wherein in the step (3), the polyarylene sulfide porous particles and the carbonated water are brought into contact with each other at a temperature of 60° C. or lower.

6. A production method for a polyarylene sulfide, comprising:
   a step of purifying a polyarylene sulfide by the purification method according to claim 1.

7. The production method for a polyarylene sulfide according to claim 6, wherein
   the purified polyarylene sulfide is porous particles having a specific surface area in a range of 10 [m²/g] or more.

8. The production method for a polyarylene sulfide according to claim 6, wherein
   the purified polyarylene sulfide has a ratio of a content of a compound (1) represented by the following structural formula (1) in a range of more than 1000 [ppm] to 3000 [ppm] or less,

[Chem. 2]

(1)

in the formula, Ar represents an aryl group having a halogen atom, R¹ represents a hydrogen atom, an alkyl group having 1 to 3 carbon atoms, or a cyclohexyl group, R² represents an alkylene group having 3 to 5 carbon atoms, and X represents a hydrogen atom or an alkali metal atom.

9. The production method for a polyarylene sulfide according to claim 6, wherein
   the purified polyarylene sulfide has an isothermal crystal acceleration in a range of 4 minutes or longer and 9 minutes or shorter (here, a measured value when the purified polyarylene sulfide is melted at 350° C./3 min, then rapidly cooled (210° C./min) from 350° C. to 240° C., and held at a cooled temperature (240° C.) for 15 minutes using a differential scanning calorimeter).

10. The purification method according to claim 2, wherein in the step (3), the polyarylene sulfide porous particles and the carbonated water are brought into contact with each other under a pressure smaller than 0.1 MPa.

11. The purification method according to claim 3, wherein in the step (3), the polyarylene sulfide porous particles and the carbonated water are brought into contact with each other under a pressure smaller than 0.1 MPa.

12. The purification method according to claim 2, wherein in the step (3), the polyarylene sulfide porous particles and the carbonated water are brought into contact with each other at a temperature of 60° C. or lower.

13. The purification method according to claim 3, wherein in the step (3), the polyarylene sulfide porous particles and the carbonated water are brought into contact with each other at a temperature of 60° C. or lower.

14. The purification method according to claim 4, wherein in the step (3), the polyarylene sulfide porous particles and the carbonated water are brought into contact with each other at a temperature of 60° C. or lower.

15. A production method for a polyarylene sulfide, comprising:
   a step of purifying a polyarylene sulfide by the purification method according to claim 2.

16. A production method for a polyarylene sulfide, comprising:
   a step of purifying a polyarylene sulfide by the purification method according to claim 3.

17. A production method for a polyarylene sulfide, comprising:
   a step of purifying a polyarylene sulfide by the purification method according to claim 4.

18. A production method for a polyarylene sulfide, comprising:
   a step of purifying a polyarylene sulfide by the purification method according to claim 5.

* * * * *